US012754045B2

United States Patent
(12) United States Patent
Qiao et al.

(10) Patent No.: US 12,754,045 B2
(45) Date of Patent: Oct. 6, 2026

(54) DEMODULATION SYSTEM FOR OPTICAL FIBER FABRY-PEROT SENSOR

(71) Applicant: BEIJING BYWAVE SENSING TECHNOLOGY CO., LTD., Beijing (CN)

(72) Inventors: Meng Qiao, Beijing (CN); Lizhe Zhang, Beijing (CN); Yuqing Luo, Beijing (CN)

(73) Assignee: BEIJING BYWAVE SENSING TECHNOLOGY CO., LTD., Beijing (CN)

( * ) Notice: Subject to any disclaimer, the term of this patent is extended or adjusted under 35 U.S.C. 154(b) by 102 days.

(21) Appl. No.: 18/841,193

(22) PCT Filed: Feb. 23, 2022

(86) PCT No.: PCT/CN2022/077481

§ 371 (c)(1),
(2) Date: Aug. 23, 2024

(87) PCT Pub. No.: WO2023/159395

PCT Pub. Date: Aug. 31, 2023

(65) Prior Publication Data

US 2025/0164233 A1 May 22, 2025

(51) Int. Cl.
*G01D 5/353* (2006.01)
*G01H 9/00* (2006.01)
(Continued)

(52) U.S. Cl.
CPC ......... *G01D 5/35312* (2013.01); *G01H 9/004* (2013.01); *G01K 11/32* (2013.01); *G01L 1/242* (2013.01); *G01B 2290/25* (2013.01)

(58) Field of Classification Search
CPC .............. G01B 9/0201; G01B 9/02011; G01B 9/02012; G01B 9/02014; G01B 9/0209;
(Continued)

(56) References Cited

U.S. PATENT DOCUMENTS 4,755,668 A * 7/1988 Davis ..................... G01K 1/026 250/227.27
5,202,939 A * 4/1993 Belleville .......... G02B 6/29359 250/227.27
(Continued)

FOREIGN PATENT DOCUMENTS

CN 101031830 A * 9/2007
CN 101509828 B * 12/2010
(Continued)

*Primary Examiner* — Gordon J Stock, Jr.
(74) *Attorney, Agent, or Firm* — Scully, Scott, Murphy & Presser, P.C.

(57) ABSTRACT

A demodulation system for optical fiber Fabry-Perot sensor, including: a light source; a Fabry-Perot sensor; a coupler; a first optical component configured to shape interference light into a linear first interference fringe pattern; a second optical assembly configured to form a second interference fringe pattern; a first detector configured to receive a first light signal to form a first light signal curve; a second detector configured to receive a second light signal to form a second light signal curve; a data collection device configured to receive the first light signal curve from the first detector to generate a first light intensity curve, and receive the second light signal curve from the second detector to generate a second light intensity curve; and a processor configured to calculate a cavity length variation of the Fabry-Perot sensor on the basis of the first light intensity curve and the second light intensity curve.

10 Claims, 2 Drawing Sheets

(51) Int. Cl.
*G01K 11/32* (2021.01)
*G01L 1/24* (2006.01)

(58) Field of Classification Search
CPC ............ G01B 9/02023; G01B 9/02055; G01B 9/02034; G01B 9/02041; G01B 9/02056; G01B 9/0207; G01B 9/02072; G01B 9/02074; G01B 9/02075; G01B 9/02078; G01B 9/02079; G01B 9/02081; G01B 9/02083; G01B 9/02089; G01B 9/02087; G01B 2290/25; G01B 2290/45; G01B 2290/70; G01D 5/35306; G01D 5/35309; G01D 5/35312; G01D 5/266; G01D 5/268; G01D 5/28; G01D 5/30; G01D 5/34; G01D 5/344; G01H 9/004; G01H 9/00; G01K 11/32; G01L 1/241; G01L 1/242; G01L 1/24; G01L 11/02; G01L 11/025; G01L 9/00; G01L 9/0001; G01L 9/0007; G01L 9/0032; G01L 9/0076; G01L 9/0077; G01L 9/0079; G01L 9/0026; G02B 5/30; G02B 5/3083; G02B 6/29346; G02B 6/29358; G02B 6/29359; G02F 2/00; G02F 2/002; G02F 2/004; G02F 2/006; G02F 2/008; G01J 3/26; G01J 9/00; G01J 9/02; G01J 2009/0234; G01J 2009/0238; G01J 2009/0249; G01J 2009/0257; G01J 2009/0261; G01J 2009/0265; G01J 2009/0292
See application file for complete search history.

(56) References Cited

U.S. PATENT DOCUMENTS

| | | | | | |
|---|---|---|---|---|---|
| 5,301,001 | A * | 4/1994 | Murphy | G01B 11/22 | 356/482 |
| 5,349,439 | A * | 9/1994 | Graindorge | G01B 9/02032 | 356/453 |
| 5,392,117 | A * | 2/1995 | Belleville | G02B 6/4215 | 250/227.27 |
| 5,517,022 | A * | 5/1996 | Bock | G01N 21/23 | 250/231.19 |
| 6,173,091 | B1 * | 1/2001 | Reich | G01L 1/241 | 356/519 |
| 7,016,047 | B2 * | 3/2006 | May | G01D 5/35303 | 356/519 |
| 7,259,862 | B2 * | 8/2007 | Duplain | G01B 9/02023 | 356/491 |
| 7,728,984 | B2 * | 6/2010 | Waegli | G01K 11/3206 | 356/454 |
| 2005/0231728 | A1 * | 10/2005 | Wang | G01B 9/02041 | 356/480 |
| 2018/0283969 | A1 * | 10/2018 | Wang | G01L 9/0032 | |

FOREIGN PATENT DOCUMENTS

| | | | | | |
|---|---|---|---|---|---|
| CN | 102052902 | B | * | 10/2012 | |
| CN | 102322801 | B | * | 12/2012 | G01B 9/02057 |
| CN | 102519498 | B | * | 6/2014 | |
| CN | 203642944 | U | | 6/2014 | |
| CN | 103033202 | B | * | 6/2015 | |
| CN | 103267536 | B | * | 8/2015 | |
| CN | 103542870 | B | * | 3/2016 | |
| CN | 108507597 | A | * | 9/2018 | G01D 5/30 |
| CN | 109141700 | A | * | 1/2019 | G01K 11/32 |
| CN | 109459073 | A | | 3/2019 | |
| CN | 110081815 | A | | 8/2019 | |
| CN | 112665754 | A | * | 4/2021 | |
| CN | 113176032 | A | * | 7/2021 | G01L 1/242 |
| CN | 113405578 | A | * | 9/2021 | G01D 3/028 |
| RU | 2334965 | C2 | * | 9/2008 | |
| WO | WO-2007019574 | A2 | * | 2/2007 | G01B 9/02072 |
| WO | WO-2021212266 | A1 | * | 10/2021 | G01L 11/02 |
| WO | WO-2021212271 | A1 | * | 10/2021 | G01D 5/353 |

* cited by examiner

DEMODULATION SYSTEM FOR OPTICAL FIBER FABRY-PEROT SENSOR

CROSS-REFERENCE TO RELATED APPLICATION

The present application is a U.S. National Phase Entry under 35 U.S.C. § 371 of PCT International Application No.: PCT/CN2022/077481 filed on Feb. 23, 2022, the entire contents of which is incorporated herein by reference as a part of the present application.

TECHNICAL FIELD

The present disclosure relates to a demodulation system for optical fiber Fabry-Perot sensor.

BACKGROUND

Optical fiber Fabry-Perot (F-P) sensor has advantages of simple structure, small volume, high sensitivity, good stability and being free from electromagnetic interference, so it is widely applied in fields of measuring strain, temperature, pressure and others. In application of the optical fiber F-P sensor, a demodulation system is used to continuously send light signals to the optical fiber F-P sensor and receive light signals with information of measurement from the optical fiber F-P sensor, and extract information needed after photoelectric conversion, signal acquisition and signal demodulation. Specifically, the light signal received by the F-P sensor undergoes multi-beam interference in its cavity. When the cavity length of the F-P sensor varies with the variation of the external physical quantity to be measured, the light signal is modulated accordingly. The modulated light signal is reflected by the F-P sensor and transmitted to a signal collection system via a coupler. Then, the modulated light signal is demodulated by a computer. Therefore, the variation of the physical quantity to be measured can be obtained by inversion of the variation of cavity length of the F-P sensor. Therefore, the demodulation system is the core of the application of the optical fiber F-P sensor.

At present, the demodulation system for optical fiber F-P sensor generally adopts wavelength demodulation method, which requires tunable laser or spectrometer, which is high in cost and slow in speed.

In some other solutions, the demodulation system for optical fiber F-P sensor adopts intensity demodulation method, which obtains the cavity length information by measuring variation of the output light intensity, which has characteristics of low cost and fast demodulation speed. However, in the intensity demodulation method, the output light intensity of the optical fiber F-P sensor has a sinusoidal relationship with the variation of the F-P cavity length. Obviously, one output light intensity corresponds to multiple values of cavity length variation. In order to obtain a single-valued relationship between the output light intensity and the cavity length variation, it is necessary to limit the cavity length variation in a small range, which greatly limits the demodulation range. In addition, when the physical quantity to be measured dynamically changes back and forth, there will be obvious inflection points in the interference fringes, but when the inflection points happen to be the highest points or lowest points of the sinusoidal curve, the inflection points cannot be judged accurately. Therefore, for physical quantities changing back and forth, it is a difficult problem that has to be solved by the intensity demodulation method of optical fiber F-P sensor that how to both take advantage of the fast speed of the intensity demodulation method and accurately judge the inflection points.

SUMMARY

Therefore, it is an object of the present disclosure to provide a demodulation system for optical fiber Fabry-Perot sensor. The demodulation system uses a combination of the fringe counting method and the intensity demodulation method to demodulate the cavity length variation of the Fabry-Perot sensor, which not only ensures the demodulation speed, but also ensures the demodulation accuracy. In addition, the demodulation system uses two beams with a phase difference of 90 degrees for detection, which ensures that the inflection points of the interference fringes can be accurately judged when the physical quantity to be measured dynamically changes back and forth, thus further improving the demodulation accuracy and expanding the application scenarios.

The present disclosure relates to a demodulation system for optical fiber Fabry-Perot sensor, which includes a light source: a Fabry-Perot sensor configured such that light undergoes multi-beam interference therein to form interference light: a coupler configured to receive light emitted from the light source and transmit the light to the Fabry-Perot sensor and transmit the interference light formed by the Fabry-Perot sensor: a first optical assembly configured to shape the interference light into a linear first interference fringe pattern: a second optical assembly configured to form a second interference fringe pattern on the basis of the linear first interference fringe pattern: a first detector provided in an light path downstream of the second optical assembly and configured to receive a first light signal to form a first light signal curve: a second detector provided in the light path downstream of the second optical assembly and configured to receive a second light signal to form a second light signal curve; a data collection device configured to receive the first light signal curve from the first detector to generate a first light intensity curve and receive the second light signal curve from the second detector to generate a second light intensity curve; and a processor configured to receive the first light intensity curve and the second light intensity curve from the data collection device, and calculate a cavity length variation of the Fabry-Perot sensor on the basis of the first light intensity curve and the second light intensity curve, wherein the first light signal and the second light signal have a phase difference of 90 degrees.

In an embodiment, the demodulation system for optical fiber Fabry-Perot sensor further includes: a first optical fiber jumper provided between the second optical assembly and the first detector and configured to transmit the first light signal; and a second optical fiber jumper provided between the second optical assembly and the second detector and configured to transmit the second light signal.

In an embodiment, the first optical assembly includes a cylindrical lens or a cylindrical mirror.

In an embodiment, the second optical assembly includes a first polarizer and a second polarizer, wherein the polarization direction of the first polarizer and the polarization direction of the second polarizer are perpendicular or parallel to each other.

In an embodiment, the second optical assembly further includes a birefringent element, and the birefringent element is provided between the first polarizer and the second polarizer.

In an embodiment, the birefringent element has a wedge shape.

In an embodiment, the width of bright stripe and the width of dark stripe of the second interference fringe pattern are adjusted by setting the inclination angle of the birefringent element.

In an embodiment, the birefringent element is provided near the focal plane of the first optical assembly.

In an embodiment, the processor is configured to perform division operation on the first light intensity curve and the second light intensity curve to generate a third light intensity curve, and calculate the cavity length variation of the Fabry-Perot sensor on the basis of the third light intensity curve.

In an embodiment, the cavity length variation is obtained on the basis of the sum of a first cavity length variation related to an integer wavelength part and a second cavity length variation related to a non-integer wavelength part, wherein the processor is configured to calculate the first cavity length variation on the basis of the number of wavelengths included in the integer wavelength part and calculate the second cavity length variation using a light intensity-cavity length function.

In an embodiment, the third light intensity curve is a tangent curve.

BRIEF DESCRIPTION OF THE DRAWINGS

In order to explain the technical solution of the embodiment of the present disclosure more clearly, the attached drawings of the embodiment of the present disclosure will be briefly introduced below. The drawings are only used to show some embodiments of the present disclosure, and are not limited to all embodiments of the present disclosure. In the attached drawings.

DETAILED DESCRIPTION OF THE EMBODIMENTS

Figure 1:
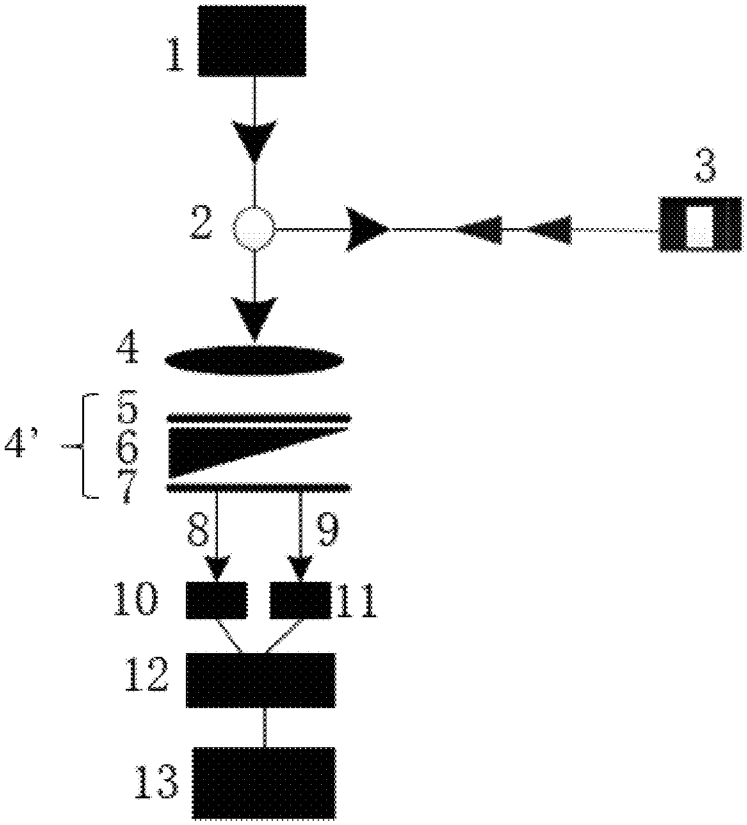
FIG. 1 shows a schematic diagram of a demodulation system for optical fiber Fabry-Perot sensor according to an embodiment of the present disclosure.

In order to make the purpose, solutions and advantages of the technical solutions of the present disclosure clearer, the technical solutions of the embodiments of the present disclosure will be described clearly and completely with the accompanying drawings of specific embodiments of the present disclosure. In the drawings, the same reference numerals represent the same parts. It should be noted that the described embodiments are part of the embodiments of the present disclosure, but not all of them. On the basis of the described embodiments of the present disclosure, all other embodiments obtained by those of ordinary skills in the art without creative labor are within the protection scope of the present disclosure.

Unless otherwise defined, the technical terms or scientific terms used here shall have their ordinary meanings as understood by those with ordinary skills in the field to which the present disclosure belongs. The words "first", "second" and the like used in the description and claims of the patent application of the present disclosure do not indicate any order, quantity or importance, but are only used to distinguish different components. Similarly, words "a" or "an" and the like do not necessarily mean quantity limitation. Words "comprising", "including" or "having" and the like mean that the elements or objects appearing before the word cover the listed elements or objects appearing after the word and their equivalents, without excluding other elements or objects. Words "connecting" or "communicating" and the like are not limited to physical or mechanical connection or communication shown in the drawings, but may include the equivalent connection or communication, whether directly or indirectly. "Up", "down", "left" and "right" are only used to express relative positional relationship. When the absolute position of the described object changes, the relative positional relationship may also change accordingly.

Preferred embodiments of the demodulation system for optical fiber Fabry-Perot sensor according to the present disclosure will be described in detail with reference to FIGS. 1 to 4.

In order to solve the problem of slow speed of the wavelength demodulation method, the present disclosure adopts intensity demodulation method. Information of the cavity length of the optical fiber F-P sensor is obtained by measuring variation of the output light intensity. Specifically, the demodulation system for optical fiber Fabry-Perot sensor of the present disclosure uses a monochromatic light source, and directly uses a photoelectric detector to receive the light output by the Fabry-Perot sensor. With the variation of the cavity length of the Fabry-Perot sensor, its output light intensity also varies. The relationship between the reflected light intensity and the cavity length of the Fabry-Perot sensor is expressed by the following formula:

$$I_R \approx 2R\left[1-\cos\left(\frac{4\pi}{\lambda}L\right)\right]\cdot I_0$$

wherein $I_R$ is the reflected light intensity, L is the cavity length of the Fabry-Perot sensor, $I_0$ is the initial light intensity, that is, the light intensity of the light beam emitted by the light source, and R is the cavity reflectivity of the Fabry-Perot sensor.

It can be seen from the above formula that when a curve is drawn with the cavity length as the abscissa and the reflected light intensity as the ordinate, the reflected light intensity has a sinusoidal relationship with the cavity length. Obviously, one output light intensity, that is, one reflected light intensity, corresponds to multiple cavity lengths. That is, the output light intensity is a multi-valued function of the cavity length. However, with the above formula, only the cavity length variation corresponding to the part less than an integer period can be calculated.

In an embodiment of the present disclosure as shown in FIG. 1, the demodulation system for optical fiber Fabry-Perot sensor includes a light source 1, a coupler 2, a Fabry-Perot sensor 3, a first optical assembly 4, a second optical assembly 4', a first optical fiber jumper 8, a second optical fiber jumper 9, a first detector 10, a second detector 11, a data collection device 12 and a processor 13.

The light source 1 is, for example, a semiconductor laser configured to emit narrow-band monochromatic light. Considering the transmission loss of optical fiber, the light source 1 emits light with a wavelength of 1550 nm, for example. Of course, the light source 1 of the present disclosure can also emit light of another wavelength, depending on the specific situation.

The coupler 2 receives the light emitted from the light source 1 and transmits it to the Fabry-Perot sensor 3, in which the light undergoes multi-beam interference to form interference light. The Fabry-Perot sensor 3 described herein is a common Fabry-Perot sensor in the field, and includes, for example, two parallel surfaces between which light undergoes multi-beam interference. The Fabry-Perot sensor 3 interacts with the to-be-measured physical quantity changing back and forth, so that the cavity length of the Fabry-Perot sensor changes, which leads to variation of the interference signal.

Then, the Fabry-Perot sensor 3 transmits (or reflects) the interference light formed by modulation to the coupler 2, and the coupler 2 transmits the interference light to the downstream optical components.

The first optical assembly 4 is configured to shape the interference light from the coupler 2 into a linear first interference fringe pattern. For example, the first optical assembly 4 includes a cylindrical lens that converges the interference light into linear interference light. In another embodiment, the first optical assembly 4 may include a cylindrical mirror. In this case, the light path shown in FIG. 1 needs to be modified accordingly, and optical components need to be added or reduced as necessary. Of course, the first optical assembly 4 may also include any other optical element that can form a linear beam.

The second optical assembly 4' is configured to form a second interference fringe pattern on the basis of the linear first interference fringe pattern generated by the first optical assembly 4, and the second interference fringe pattern is sharper than the first interference fringe pattern, that is, the linear interference light is expanded in space to form a clearer interference fringe pattern. For example, the second optical assembly includes a first polarizer 5 and a second polarizer 7, and the polarization direction of the first polarizer 5 and the polarization direction of the second polarizer 7 are perpendicular or parallel to each other. By setting two polarizers with mutually perpendicular or parallel polarization directions, the contrast of the interference fringes can be improved.

In addition, the second optical assembly further includes a birefringent element 6, such as a birefringent crystal. The birefringent element 6 is provided between the first polarizer 5 and the second polarizer 7. As shown in FIG. 1, the birefringent element 6 may have a wedge shape. The inclination angle of the birefringent element may be selected such that the bright stripes and dark stripes of the interference fringe pattern have widths that can be resolved by the downstream light signal receiving elements. That is, by setting the inclination angle of the birefringent element 6, the widths of the bright stripes and dark stripes of the interference fringes can be adjusted for subsequent detection. For example, when the inclination angle of the birefringent element 6 is set so that the widths of the bright stripes and dark stripes of the interference fringe pattern are relatively small, an optical fiber jumper is used to receive the light signal emitted from the second optical assembly. For example, when the inclination angle of the birefringent element 6 is set so that the widths of the bright stripes and dark stripes of the interference fringe pattern are relatively large, the light signal emitted from the second optical assembly can be received by directly using the detector without using an optical fiber jumper. That is, the inclination angle of the birefringent element is selected such that the widths of the bright stripes and dark stripes of the second interference fringe pattern are adapted to the light signal receiving elements downstream of the second optical assembly. The specific values of the inclination angle of the birefringent element and the widths of the bright stripes and the dark stripes of the interference fringe pattern can be determined according to the type of the light signal receiving elements used downstream, regarding which the present disclosure does not pose limitation herein.

For example, the birefringent element 6 may be provided near the focal plane of the first optical assembly 4, and at this time, an interference fringe pattern of alternating bright and dark stripes can be formed behind the birefringent element 6.

The first optical fiber jumper 8 may be, for example, provided between the second optical assembly and the first detector 10 and configured to correspond to a bright stripe of the second interference fringe pattern and transmit a first light signal on the basis of the bright stripe. The second optical fiber jumper 9 may be, for example, provided between the second optical assembly and the second detector 11 and configured to correspond to a dark stripe of the second interference fringe pattern and transmit a second light signal on the basis of the dark stripe. Term "correspond" as mentioned herein means that the first optical fiber jumper 8 is provided at a position corresponding to a bright stripe in the interference fringe pattern, and the second optical fiber jumper 9 is provided at a position corresponding to a dark stripe in the interference fringe pattern. In this way, the respective light signals received by the first optical fiber jumper 8 and the second optical fiber jumper 9 have a phase difference of $2k\pi\pm\pi/2$, for example, 90 degrees. Of course, the present disclosure is not limited to this, and the first optical fiber jumper 8 and the second optical fiber jumper 9 do not need to correspond to a bright stripe and a dark stripe respectively, as long as the respective light signals transmitted by them have a phase difference of 90 degrees.

For example, the first optical fiber jumper 8 and the second optical fiber jumper 9 are provided next to the second polarizer 7. Alternatively, the first optical fiber jumper 8 and the second optical fiber jumper 9 may be provided with a certain distance from the second polarizer 7 respectively.

Figure 2:
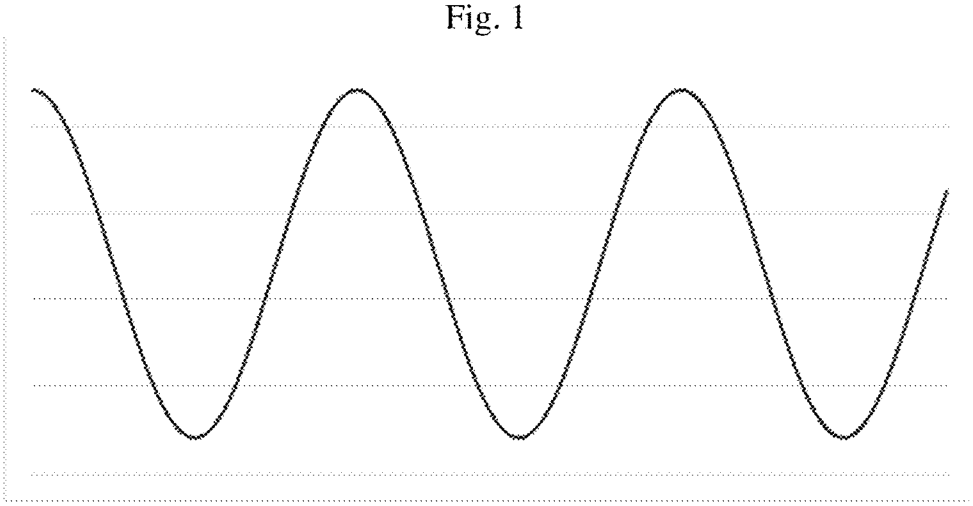
FIG. 2 shows a first light intensity curve obtained by a first detector of a demodulation system for optical fiber Fabry-Perot sensor according to an embodiment of the present disclosure.
Figure 3:
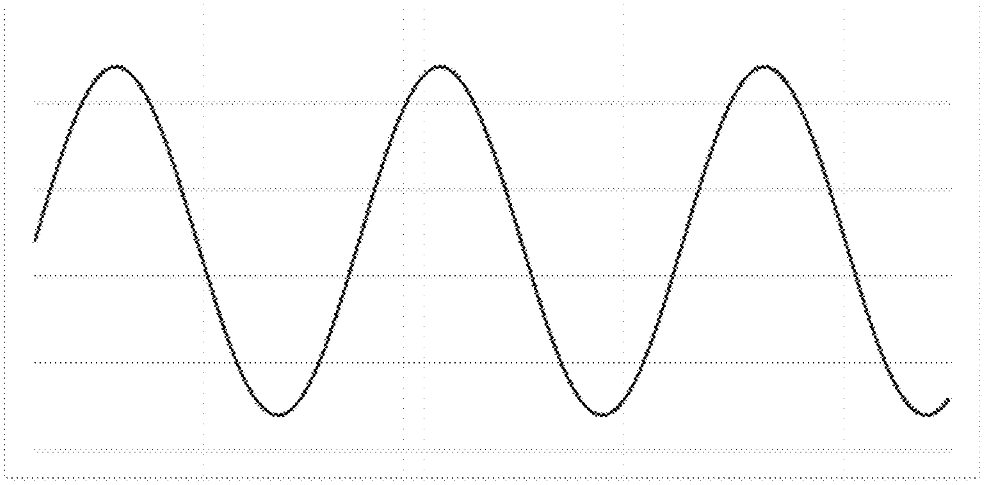
FIG. 3 shows a second light intensity curve obtained by a second detector of a demodulation system for optical fiber Fabry-Perot sensor according to an embodiment of the present disclosure.

The first detector 10 may be configured to receive the first light signal from the first optical fiber jumper 8 to form a first light signal curve, such as the cosine light intensity curve shown in FIG. 2. For example, the first detector 10 is provided at the output end of the first optical fiber jumper 8. The second detector 11 may be configured to receive the second light signal from the second optical fiber jumper 9 to form a second light signal curve, such as a sinusoidal light intensity curve shown in FIG. 3. For example, the second detector 11 is provided at the output end of the second optical fiber jumper 9. For example, the first detector 10 and the second detector 11 are photodetectors such as avalanche photodiodes for converting the light signals into electrical signals and converting analog signals into digital signals. Then, the digital signals are transmitted to the subsequent devices. In a case that the widths of the bright stripes and dark stripes of the second interference fringe pattern formed by the second optical assembly 4' are relatively large, or the widths are resolvable by detectors, the first and second optical fiber jumpers can be dispensed with in the demodulation system for optical fiber Fabry-Perot sensor, and the first detector 10 and the second detector 11 can be directly provided in the light path downstream of the second optical assembly for respectively receiving the first light signal and the second light signal with a phase difference of 90 degrees.

The data collection device 12 is configured to receive the first light signal curve from the first detector 10 to generate a first light intensity curve, and to receive the second light signal curve from the second detector 11 to generate a second light intensity curve. The first light intensity curve and the second light intensity curve may respectively correspond to the trigonometric function curves shown in FIGS. 2 and 3, for example, having similar shapes and the like. For example, the data collection device 12 is a high-speed acquisition card. For example, the data collection device 12 communicates with the first detector 10 and the second detector 11 in a wired or wireless manner.

The processor 13 is configured to receive the first light intensity curve and the second light intensity curve from the data collection device 12 and calculate the cavity length variation of the Fabry-Perot sensor on the basis of the first light intensity curve and the second light intensity curve. For example, the processor 13 is a computer. For example, the processor 13 communicates with the data collection device 12 in a wired or wireless manner.

Figure 4:
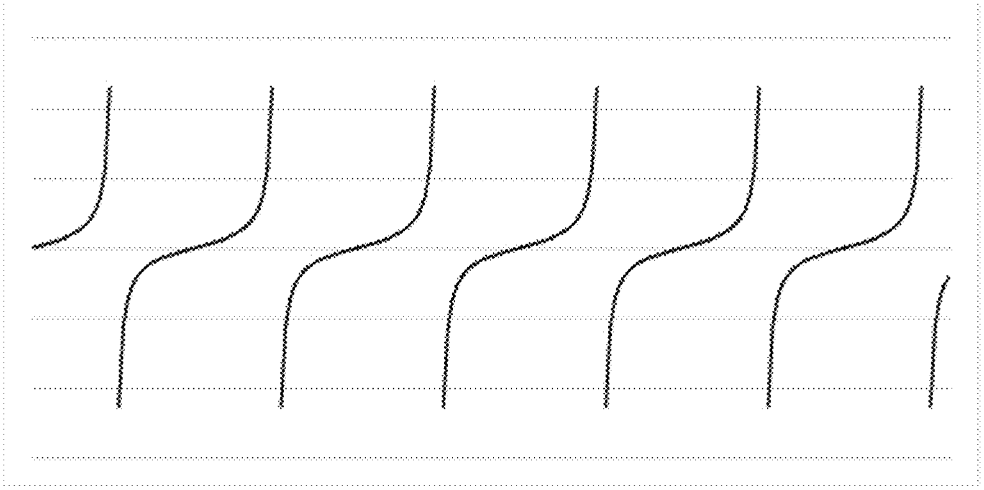
FIG. 4 shows a third light intensity curve generated by the first light intensity curve and the second light intensity curve.

The processor 13 is configured to perform division operation on the first light intensity curve and the second light intensity curve to generate a third light intensity curve, such as the tangent curve shown in FIG. 4. By obtaining a tangent curve steeper than a sine function or a cosine function, it is easier to determine the inflection points, so the accuracy of demodulation can be improved. In addition, the application scenarios of the demodulation system of the present disclosure can be expanded in this way, so that the demodulation system is not only suitable for measuring physical quantities varying monotonically, but also suitable for measuring physical quantities varying back and forth.

The processor 13 is also configured to calculate the cavity length variation of the Fabry-Perot sensor on the basis of the third light intensity curve. The demodulation system of the present disclosure adopts a two-step method to process the signals obtained by the processor. First, the processor 13 is configured to calculate a first cavity length variation $\Delta L_1$ related to an integer wavelength part using a fringe counting method. The "using a fringe counting method" mentioned herein refers to performing counting on the basis of the number of wavelengths contained in the integer wavelength part. According to the interference theory, one period of the tangent function corresponds to a cavity length variation of $\lambda/4$. Therefore, with the fringe counting method, it can be obtained that the cavity length variation corresponding to n periods is $n\lambda/4$. Then, the processor 13 uses the above-mentioned light intensity-cavity length relation (i.e., using the light intensity demodulation method) to calculate a second cavity length variation $\Delta L_2$ related to the non-integer wavelength part. Therefore, the total cavity length variation is denoted as $\Delta L=\Delta L_1+\Delta L_2$. According to the sensitivity of the sensor, the variation of the physical quantity to be measured corresponding to the cavity length variation can be obtained.

The demodulation system of the present disclosure uses a combination of the fringe counting method and the intensity demodulation method to demodulate the cavity length variation of the Fabry-Perot sensor, which not only ensures the demodulation speed, but also ensures the demodulation accuracy. In addition, the demodulation system uses two beams with a phase difference of 90 degrees for detection, which ensures that the inflection points of the interference fringes can be accurately judged when the physical quantity to be measured dynamically changes back and forth, thus further improving the demodulation accuracy and expanding the application scenarios. Furthermore, the demodulation system of the present disclosure does not need expensive and large-size wavelength-related means, the device is simple, and the manufacturing cost is greatly reduced.

In addition, the technical features disclosed above are not limited to the combinations with other features as already disclosed, and those skilled in the art can also perform other combinations of the technical features according to the purpose of disclosure, so as to achieve the purpose of the present disclosure.

What is claimed is:

1. A demodulation system for optical fiber Fabry-Perot sensor comprising:
- a light source;
- a Fabry-Perot sensor configured such that light undergoes multi-beam interference in the Fabry-Perot sensor to form interference light;
- a coupler configured to receive light emitted from the light source and transmit the light to the Fabry-Perot sensor and transmit the interference light formed by the Fabry-Perot sensor;
- a first optical assembly configured to shape the interference light into a linear first interference fringe pattern, wherein the first optical assembly comprises a cylindrical lens or a cylindrical mirror;
- a second optical assembly configured to form a second interference fringe pattern on the basis of the linear first interference fringe pattern;
- a first detector provided in a light path downstream of the second optical assembly and configured to receive a first light signal to form a first light signal curve;
- a second detector provided in the light path downstream of the second optical assembly and configured to receive a second light signal to form a second light signal curve;
- a data collection device configured to receive the first light signal curve from the first detector to generate a first light intensity curve and receive the second light signal curve from the second detector to generate a second light intensity curve; and
- a processor configured to receive the first light intensity curve and the second light intensity curve from the data collection device, and calculate a cavity length variation of the Fabry-Perot sensor on the basis of the first light intensity curve and the second light intensity curve, wherein the first light signal and the second light signal have a phase difference of 90 degrees.

2. The demodulation system for optical fiber Fabry-Perot sensor according to claim 1, further comprising:
- a first optical fiber jumper provided between the second optical assembly and the first detector and configured to transmit the first light signal; and
- a second optical fiber jumper provided between the second optical assembly and the second detector and configured to transmit the second light signal.

3. The demodulation system for optical fiber Fabry-Perot sensor according to claim 1, wherein the processor is configured to perform a division operation on the first light intensity curve and the second light intensity curve to generate a third light intensity curve, and calculate the cavity length variation of the Fabry-Perot sensor on the basis of the third light intensity curve.

4. The demodulation system for optical fiber Fabry-Perot sensor according to claim 3, wherein the cavity length variation is obtained on the basis of a sum of a first cavity length variation related to an integer wavelength part and a second cavity length variation related to a non-integer wavelength part, and wherein the processor is configured to calculate the first cavity length variation on the basis of a number of wavelengths included in the integer wavelength part and calculate the second cavity length variation using a light intensity-cavity length function.

5. The demodulation system for optical fiber Fabry-Perot sensor according to claim 3, wherein the third light intensity curve is a tangent curve.

6. The demodulation system for optical fiber Fabry-Perot sensor according to claim 1, wherein the second optical assembly comprises a first polarizer and a second polarizer, and wherein a polarization direction of the first polarizer and a polarization direction of the second polarizer are perpendicular or parallel to each other.

7. The demodulation system for optical fiber Fabry-Perot sensor according to claim 6, wherein the second optical assembly further comprises a birefringent element, and the birefringent element is provided between the first polarizer and the second polarizer.

8. The demodulation system for optical fiber Fabry-Perot sensor according to claim 7, wherein the birefringent element has a wedge shape.

9. The demodulation system for optical fiber Fabry-Perot sensor according to claim 8, wherein widths of bright stripes and dark stripes of the second interference fringe pattern are adjusted by setting an inclination angle of the birefringent element.

10. The demodulation system for optical fiber Fabry-Perot sensor according to claim 7, wherein the birefringent element is provided at a focal plane of the first optical assembly or adjacent to the focal plane of the first optical assembly.

* * * * *